United States Patent [19]

Biale

[11] Patent Number: 5,116,901

[45] Date of Patent: May 26, 1992

[54] LATEX-LIPOPHILIC POLYMER GRAFT POLYMERIZATION PROCESS

[75] Inventor: John Biale, Anaheim, Calif.

[73] Assignee: Union Oil Company of California, Los Angeles, Calif.

[21] Appl. No.: 444,551

[22] Filed: Nov. 30, 1989

[51] Int. Cl.$^5$ .............................................. C08F 8/00
[52] U.S. Cl. .................................. 524/457; 524/839; 525/131
[58] Field of Search ................. 524/457, 839; 525/131

[56] References Cited

U.S. PATENT DOCUMENTS

| | | | |
|---|---|---|---|
| 4,002,589 | 1/1977 | Farley et al. | 525/246 |
| 4,318,883 | 3/1982 | Guagliardo | 524/457 |
| 4,730,021 | 3/1988 | Zom et al. | 524/457 |
| 4,888,383 | 12/1989 | Huybrechts | 524/832 |

OTHER PUBLICATIONS

Gurruchaga et al., *Journal of Polymer Science:* vol. 27:149–152, (1989) John Wiley & Sons, Inc.

Mekras et al., *Polymer*, 30:745–751 (1989).

McCormick et al., *Journal of Polymer Science:* vol. 22:49–60 (1984) John Wiley & Sons, Inc.

Mino et al., *Journal of Polymer Science:* vol. XXXI, Issue No. 122 pp. 242–243 (1950).

Paint and Surface Coatings: Theory and Practice, Lambourne, Editor, John Wiley & Sons, Halsted Press Division, pp. 97–100 (1987).

1989 Federation Paint Show Program, Federation Society of Coating Technology, 67th Annua; Meeting and 54th Paint Industry Show, New Orleans, Nov. 8–10, 1989, p. 156, Hasegawa et al. abstract.

*Primary Examiner*—Joseph L. Schofer
*Assistant Examiner*—Jeffizey T. Smith
*Attorney, Agent, or Firm*—Gregory F. Wirzbicki; Shlomo R. Frieman

[57] ABSTRACT

Latex-liopophilic polymers comprise of a lipophilic polymer and polymerized alpha, beta-ethylenically unsaturated monomer units are formed by polymerizing alpha, beta-ethylenically unsaturated monomer units in an aqueous medium containing a lipophilic polymer, an initiation catalyst, and, optionally, a graft promoting system. Typically, the latex-lipophilic polymer is a graft polymer having the lipophilic polymer as its backbone, and a plurality of the polymerized alpha, beta-ethylenically unsaturated monomer unit grafted onto the lipophilic backbone.

20 Claims, No Drawings

LATEX-LIPOPHILIC POLYMER GRAFT POLYMERIZATION PROCESS

BACKGROUND

The present invention relates to graft polymers and to processes for synthesizing graft polymers.

Polyurethanes are a highly versatile group of polymers that can be designed to incorporate a wide variety of properties, e.g., high elastic modulus, hardness, good gloss, abrasion resistance, excellent adhesion, and good weathering. Generally, polyurethanes are prepared in an organic solvent but they can be dispersed in water. However, due to their high cost (usually running from $3 to $5 per pound on a dry basis), polyurethanes are commonly restricted to high performance applications.

Polymer emulsions or latexes are much cheaper than polyurethanes but lack some of the performance characteristics of polyurethanes.

SUMMARY OF INVENTION

The present invention provides a cost effective procedure for synthesizing polyurethane-latex graft polymers. In addition, the invention provides a polyurethane-latex graft polymerization procedure that employs an aqueous medium. In particular, the process of the present invention comprises the step of polymerizing alpha, beta-ethylenically unsaturated monomer units in an aqueous medium containing a polyurethane polymer and a graft promoting system at reaction conditions sufficient to form a graft polymer comprised of the polyurethane polymer and the polymerized alpha, beta-ethylenically unsaturated monomer units.

In addition to polyurethane polymers, the graft polymerization procedure can also be conducted with other lipophilic polymers. As used in the specification and claims, the term "lipophilic polymer" means a polymer that is customarily not suitable for manufacture in water. The lipophilic polymers are used in either a substantially dry, solid form or in the form of a water dispersion.

The invention also encompasses the synthesized lipophilic-latex polymers which are employed in compositions such as latexes, paints, varnishes, etc. Although the lipophilic-latex polymers are cheaper per unit weight than their lipophilic polymer component, they can exhibit desirable properties characteristic of the lipophilic polymer.

DETAILED DESCRIPTION OF THE INVENTION

The invention provides several procedures for synthesizing lipophilic-latex graft polymers. In one version of the invention, water is added to a reactor and heated, generally to at least about 50° F. More typically, the water is heated to at least about 100° to about 200° F, and preferably to about 150° to about 190° F. While heating the water in the reactor, the reactor is preferably purged with an inert gas, such as nitrogen, to remove substantially all oxygen from the reactor. An initiation catalyst, such as t-butyl-hydroperoxide, sodium persulfate, hydrogen peroxide, or mixtures thereof, is then added to the reactor. Preferably, a locus for polymerization (e.g., a surfactant and/or a surfactant-containing seed) is added to the reactor before, simultaneously with, or after the catalyst addition to form a reactor charge.

The surfactant can be an anionic surfactant, a nonionic surfactant, or a mixture thereof. Exemplary anionic surfactants include, but are not limited to, alkylphenolethoxylate sulfates and sulfonates, alkylsulfates and sulfonates, and mixtures thereof. Nonionic surfactants include, but are not limited to, alkylarylpolyether alcohols, alkylphenolethoxylates, alkylethoxylates, ethyleneoxide/propylene oxide block copolymers, and mixtures thereof. The sulfate and sulfonate anionic surfactants are preferred.

The seed, which acts as a locus for polymerization, generally has an average particle size of less than about 80 nm, and preferably within the range of about 25 to about 60 nm. Exemplary seeds are comprised of a surfactant and a monomer, e.g., alkenyl aromatic monomers, acrylate monomers, and mixtures thereof. Usually, styrene and/or butyl acrylate monomers are employed in manufacturing the seed.

After the addition of the catalyst and locus for polymerization, a delay-addition of the remaining materials to be added to the reactor (namely, alpha, beta-ethylenically unsaturated monomer units and a lipophilic polymer) is then commenced.

The term "lipophilic polymer" denotes a polymer that is customarily not suitable for manufacture in water. An important characteristic of the lipophilic polymers is that they contain at least one (a) olefinic unsaturation in their backbone (—C=C—), (b) secondary carbon, or (c) tertiary carbon. Preferably, the lipophilic polymer contains a plurality of (a), (b), or (c), and/or a combination of (a) and/or (b) and/or (c).

Most lipophilic polymers suitable for use in the present invention are generally prepared in an organic solvent by a condensation (addition) polymerization process and are known to those skilled in the art as "condensation polymers." Besides polyurethane polymers, other typical condensation polymers include, but are not limited to, polyester polymers, epoxy polymers, silicon polymers, polyamide polymers, and polycarbonate polymers, preferably, the lipophilic polymers are low molecular weight polymers, typically having a molecular weight less than about 200,000, and more desirably less than about 100,000. The most desirable lipophilic polymers are polyurethane polymers, polyester polymers, epoxy polymers, and silicon polymers.

The lipophilic polymer is added to the reactor in either a substantially dry, solid form or in the form of a water dispersion. One method for obtaining substantially dry lipophilic polymers is to simply dry commercially available lipophilic polymer-containing organic solutions. The substantially dry lipophilic polymer can be dissolved in the alpha, beta-ethylenically unsaturated monomer units and then added to the reactor or can be added to the reactor in a pre-emulsion containing the lipophilic polymer, the monomer units, water, and the surfactant.

Water dispersions of lipophilic polymers are commercially available. For example, water dispersions of polyurethane are commercially available from NL Chemicals, Spencer Kellogg Division, Sanncor Industries, Inc., as well as from other sources. In addition, water dispersions of lipophilic polymers can be prepared by incorporating acid or amine groups onto the backbone of the lipophilic polymer and then solubilizing or dispersing the polymer by adding a volatile amine or acid to form a salt. A more detailed discussion of the methods for forming water dispersions (which are also known in the art as "water-borne systems" and "water reducible polymer systems") can be found in *Paint and Surface Coatings: Theory and Practice*, Lambourne Editor, John Wiley & Sons, Halsted Press Division (1987), pages 97–100, the publication being incorporated herein in its entirety by reference. Typically, the water dispersions of lipophilic polymers contain about 5 to about 60 weight percent solids, and preferably about 20 to about 50 weight percent solids.

The water dispersion of the lipophilic polymer can be added to the reactor as a separate feed stream or together with the monomer units in a pre-emulsion that also contains water and a surfactant. The surfactant can be a copolymerizable surfactant, an anionic surfactant, or a nonionic surfactant, or a mixture thereof. Exemplary copolymerizable surfactants include, but are not limited to, sulfoethylmethacrylate vinyl sulfonate salts, sulfopropylmethacrylate, styrene sulfonate salts, 2-acrylamido-2-methylpropanesulfonic acid salts, and mixtures thereof. Anionic surfactants include, but are not limited to, alkylphenolethoxylate sulfates and sulfonates, alkylsulfates and sulfonates, and mixtures thereof. Nonionic surfactants include, but are not limited to, alkylarylpolyether alcohols, alkylphenolethoxylates, alkylethoxylates, ethyleneoxide/propylene oxide block copolymers, and mixtures thereof.

To ensure that substantially all the monomer units polymerize, a polymerization catalyst is commonly added during the delay-addition step. The same initiation catalyst described above can be used as the polymerization catalyst.

Although the initiation catalyst and/or polymerization catalyst also function to graft a portion of the alpha, beta-ethylenically unsaturated monomer units and/or a portion of the monomer unit-containing latex polymers onto a lipophilic polymer having at least one olefinic unsaturation in its backbone, it is preferred to also employ a graft promoting system to facilitate the grafting reaction. However, when the backbone of the lipophilic polymer is devoid of olefinic unsaturation and the lipophilic polymer only contains either secondary carbons and/or tertiary carbons as the sole potential grafting sites, it is essential that a graft promoting system be employed.

An exemplary graft promoting system is a cerium ammonium nitrate/nitric acid system. Cerium ammonium nitrate/nitric acid graft promoting systems are well known to those skilled in the art. See, for example, Gurruchaga et al., *Journal of Polymer Science: Part C: Polymer Letters*. 27: 149–152 (1989); McCormick et al., *Journal of Polymer Science: Polymer Chemistry Edition*, 22: 49–60 (1984); and Mino et al., *Journal Of Polymer Science*, 31(122): 242–243 (1958), these publications being incorporated herein in their entirety by reference. A preferred cerium ammonium nitrate/nitric acid graft promoting system comprises about 0.05 to about 1 weight percent cerium ammonium nitrate (based on the weight of the alpha, beta-ethylenically unsaturated monomer units) and about 0.05 to about 1 weight percent nitric acid (based on the weight of the alpha, beta-ethylenically unsaturated monomer units). It is further preferred that the cerium ammonium nitrate/nitric acid graft promoting system contain approximately equal weight percentages of cerium ammonium nitrate and nitric acid.

When the graft promoting system is employed, it is generally added to the reactor prior to or during the delay-addition step.

The delay-addition procedure commonly takes up to about three hours. While conducting the delay-addition procedure, the temperature within the reactor is maintained at a level sufficient to promote the polymerization of the alpha, beta-ethylenically unsaturated units as well as the grafting of an entity containing at least one alpha, beta-ethylenically unsaturated unit onto the lipophilic polymer. Generally the temperature is maintained at about 100° to about 200° F., and preferably at about 150° to about 190° F.

In order to stabilize the emulsion, the pH of the emulsion is preferably adjusted towards the end of the delay-addition procedure. Usually the pH of the emulsion is adjusted from about 30 minutes before to about 30 minutes after terminating the addition of the delay-addition ingredients. Preferably, the pH adjustment is performed within about 15 minutes after the end of the delay-addition step. Typically, the pH of the emulsion is adjusted to at least about 6, preferably to about 6 to about 8, and most preferably to about 6 to about 7.

A base is generally employed to adjust the pH of the emulsion. Exemplary bases are selected from the group consisting of amine-containing bases, hydroxyl-containing bases, and mixtures thereof. Dimethyl amine, diethyl amine, aminopropanol, ammonium hydroxide, and sodium hydroxide are typical bases, with the volatile bases being preferred, and ammonium hydroxide being the most preferred.

After the delay-addition step, the temperature within the reactor is usually held at the same level as during the delay-addition step for a "cook" period, i.e., a sufficient period of time to ensure substantially complete polymerization of the alpha, beta-ethylenically unsaturated units. Typically, the cook period runs for approximately an additional 0.25 to 2 hours, and preferably for about an additional 0.5 to about 1.5 hours. During the cook period, additional polymerization catalyst is optionally added to the reactor to further ensure substantially complete polymerization of the monomer units. The same polymerization catalysts employed in the delay-addition step can be employed in the cook step. In addition, a t-butyl hydroperoxide/sodium formaldehyde sulfoxylate catalyst system can also be employed in the cook step. However, the preferred initiation catalyst for use in the cook step is sodium persulfate.

When the cook step is concluded, the emulsion is allowed to cool to ambient or room temperature. The pH of the cooled emulsion is then typically adjusted to about 6 to about 10, preferably to about 7 to about 9, and more preferably to about 8 to about. 9. The same bases as used to adjust the pH of emulsion at the end of the delay-addition step can be used to adjust the pH of the cooled emulsion.

The polymerization process yields an emulsion containing the graft lipophilic-latex polymer of the present invention. The solids content of the emulsion is almost always at least about 5 weight percent. More commonly, the emulsion contains at least about 40 weight percent solids. Preferably, about 40 to about 65 weight percent solids, and most preferably about 45 to about 55 weight percent solids, are present in the emulsion.

In an alternative procedure of the present invention, a portion of (a) the alpha, beta-ethylenically unsaturated monomer units and/or (b) the lipophilic polymer (either as a separate water dispersion feed stream or as a water dispersion-containing pre-emulsion or as a substantially dry solid dissolved in the monomer units or as a substantially dry solid-containing pre-emulsion) and/or (c) the graft promoting system is charged to the reactor prior to heating the contents of the reactor. In yet another version of the invention, all of the ingredients are initially charged to the reactor and the contents of the reactor are then heated to a temperature sufficient to polymerize the monomer units and graft an entity containing at least one monomer unit onto the lipophilic polymer.

The alpha, beta-ethylenically unsaturated monomer units employed in the present invention can be the same or different. When the same monomer units are used, the latex moiety of the resulting graft lipophilic-latex polymer is a homopolymer, and when different monomer units are used the latex moiety is a copolymer.

An exemplary class of alpha, beta-ethylenically unsaturated monomer units are alpha-olefins. Another class of alpha, beta-ethylenically unsaturated monomer units are non-hydrocarbon alpha-olefins, e.g., carboxylic acid monomers, carboxylic ester monomers, thioester monomers, nitrile monomers, and vinyl halide monomers. (As used in the specification and claims, the term "non-hydrocarbon alpha-olefins" means an alpha-olefin that further contains at least one non-carbon, non-hydrogen moiety. In other words, in addition to containing carbon and hydrogen, a non-hydrocarbon alpha-olefin also contains at least one other chemical species, e.g., sulfur, oxygen, nitrogen, halogen, etc.) Each of these classes of alpha, beta-ethylenically unsaturated hydrocarbons preferably contains 2 to about 20 carbon atoms, more preferably about 3 to about 10 carbon atoms, and most preferably about 4 to about 10 carbon atoms.

Alternatively, the alpha, beta-ethylenically unsaturated monomer units are also classifiable as soft monomers and hard monomers, as well as functional monomers and non-functional monomers. As used in the specification and claims, the term "soft monomer" means a monomer whose homopolymer has a $T_g$ of less than about $-20°$ C.; the term "hard monomer" means a monomer whose homopolymer has a $T_g$ of greater than about 30° C.; the term "functional monomer" means a monomer that contains a group, e.g., hydroxyl, carboxyl, amide, and amine, that can undergo further reaction after polymerization of the polymer; and the term "non-functional monomer" means a monomer that is devoid of any group capable of undergoing further reaction after polymerization of the monomer.

With respect to soft monomers, soft monomers include, but are not limited to, carboxylic ester monomers, vinylidene halide monomers, alkylene monomers, maleate esters, Vinyl Versatate, and alkadiene monomers. Typical soft non-functional carboxylic ester monomers are acrylic monomers having the formula I

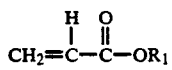
(I)

wherein $R_1$ is an alkyl group, preferably having up to about 15 carbon atoms. As used in the specification and claims, the term "alkyl" means cyclic and acyclic saturated hydrocarbon groups that can be either branched or unbranched. Exemplary soft, non-functional acrylic monomers are ethyl acrylate, butyl acrylate, isobutyl acrylate, ethylhexyl acrylate. Butyl acrylate and 2-ethylhexyl acrylate are preferred soft, non-functional monomers.

Functional, soft carboxylic ester monomers are include hydroxyalkyl acrylate monomers having the formula

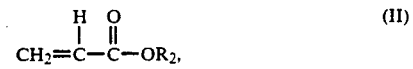
(II)

and aminoalkyl acrylate monomers having the formula III

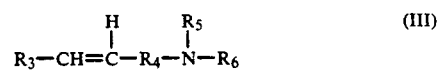
(III)

In formula II, supra, $R_2$ is a hydroxyalkyl group, preferably comprising up to about 6 carbon atoms. More preferably, the hydroxyalkyl group comprises up to 3 carbon atoms. Typical hydroxyalkyl acrylates include, but are not limited to, hydroxyethyl acrylate, hydroxypropyl acrylate, and mixtures thereof.

In formula III, supra, $R_3$ is selected from the group consisting of hydrogen and halogen, $R_4$ is a divalent alkyl radical containing 1 to about 5 carbon atoms, and $R_5$ and $R_6$ are each independently selected from the group consisting of hydrogen and alkyl radicals containing up to about 2 carbon atoms. An exemplary aminoalkyl acrylate is dimethylaminoethyl acrylate, t-butylaminoethyl acrylate, and mixtures thereof.

Illustrative soft alkylene monomers include, but are not limited to, isobutylene, ethylene, and propylene.

Exemplary alkadiene monomers have the formula IV

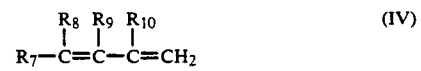
(IV)

wherein $R_7$, $R_8$, $R_9$, and $R_{10}$ are each independently selected from the group consisting of hydrogen, halogen, and alkyl radicals containing 1 to about 2 carbon atoms. Commercially available alkadiene monomers include butadiene, isoprene, 1,3-pentadiene, 2-ethyl butadiene, and 4-methyl-1,3-pentadiene. The preferred alkadiene monomer is butadiene.

Regarding the hard monomers, common hard monomers include vinyl halides, acrylonitrile, vinyl acetate, methacrylamide, alkylene aromatic monomers, carboxylic ester monomers, and olefinic carboxylic acid monomers. As used in the specification and claims, "alkenyl aromatic monomers" are defined as any organic compound containing at least one aromatic ring and at least one aliphatic-containing moiety having alkenyl unsaturation. Preferred alkenyl aromatic monomers are represented by the formula V

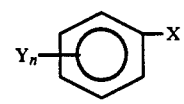
(V)

wherein X is an aliphatic radical containing at least one alkenyl bond, Y is a substituent on the aromatic ring, and n is the number of Y substituents on the ring, n being an integer from 0 to 5. Generally, X comprises at least 2 carbon atoms, but usually no more than about 6, and preferably no more than about 3 carbon atoms. X is preferably a substituted or unsubstituted alkenyl group.

Preferred substituents on the alkenyl group are halogen radicals, e.g., chloride. However, the most preferred alkenyl group is unsubstituted, i.e., a hydrocarbon, and contains only one olefinic unsaturation. Vinyl is the most preferred X.

Y is an organic or inorganic radical. As used throughout the specification and claims, the term "organic radical" means any group containing at least one carbon atom, and the term "inorganic radical" means any group devoid of carbon atoms. When n is 2 or more, Y can be the same or different. If organic, Y generally contains from 1 to about 15 carbon atoms and, preferably, is an aliphatic radical. Even more preferably, Y is a saturated aliphatic radical. If inorganic, Y is preferably a halogen. Exemplary Y substituents include halo and cyano radicals and substituted and unsubstituted alkyl radicals of 1 to about 10 carbon atoms. Preferred Y substituents are chloride and unsubstituted alkyl groups of 1 to about 6 carbon atoms. Y is more preferably a chloride radical and $C_1$ to about $C_4$ unsubstituted alkyl radicals.

Illustrative alkenyl aromatic monomers include styrene, p-methyl styrene, m-methyl styrene, o,p-dimethyl styrene, o,p-diethyl styrene, p-chlorostyrene, isopropyl styrene, t-butyl styrene, o-methyl-p-isopropyl styrene, o,p-dichlorostyrene, and mixtures thereof. Due to its commercial availability and low cost, styrene is the preferred alkenyl aromatic monomer.

With respect to hard non-functional carboxylic ester monomers, exemplary non-functional carboxylic ester monomers are methacrylic monomers having the formula VI

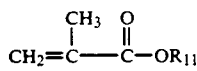
(VI)

wherein $R_{11}$ is an alkyl group that preferably contains up to about 6 carbon atoms. Typical non-functional methacrylic monomers include methyl methacrylate, ethyl methacrylate, isobutyl methacrylate, isobornyl methacrylate, and mixtures thereof.

Functional, hard carboxylic ester monomers include hydroxyalkyl methacrylate monomers having the formula VII

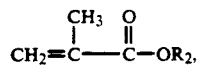
(VII)

and aminoalkyl methacrylate monomers having the formula VIII

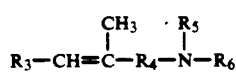
(VIII)

wherein $R_2$, $R_3$, $R_4$, $R_5$, and $R_6$ are as defined above.

Olefinic carboxylic acid monomers include both olefinic mono-carboxylic acid monomers and olefinic di-carboxylic acid monomers. Exemplary olefinic mono-carboxylic acids include, but are not limited to, acrylic acid, methacrylic acid, acryloxyacetic acid, methacryloxyacetic acid, acrylamidoglycolic acid, and mixtures thereof. Exemplary olefinic di-carboxylic acids include, but are not limited to, itaconic acid, fumaric acid, and mixtures thereof. The preferred olefinic carboxylic acid monomers are selected from the group consisting of acrylic acid, methacrylic acid, and mixtures thereof.

The halide moiety of the vinyl halide and vinylidene halide monomers is preferably either chloride or bromide, with chloride being the most preferred halide moiety.

Other functional monomers that are optionally employed, include, but are not limited to, ureido-containing monomers, cyanoacetoxy-containing monomers, and acetoacetoxy-containing monomers. The ureido-containing monomers contain a ureido group of the formula IX:

(IX)

Exemplary ureido-containing monomers include, but are not limited to, 2-ureido-ethyl acrylate, 2-ureido-methyl acrylate, 2-ureido-ethyl acrylamide, 2-ureido-ethyl methacrylamide, and 1-[2-(3-alloxy-2-hydroxypropylamino)ethyl]imidazolidin-2-one. The preferred ureido-containing monomer is 1-[2-(3-alloxy-2-hydroxypropylamino)ethyl]imidazolidin-2-one, commercially known as Sipomer WAM brand monomer and available from Alcolac Chemical Co.

Cyanoacetoxy-containing monomers and acetoacetoxy-containing monomers have the formulas X and XI, respectively,

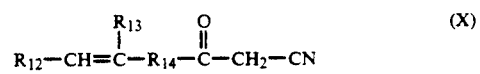
(X)

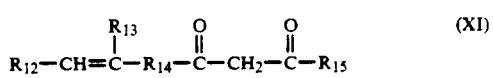
(XI)

wherein $R_{12}$ is selected from the group consisting of hydrogen and halogen, $R_{13}$ is selected from the group consisting of hydrogen, halo, thio, and monovalent organic radicals, $R_{14}$ is a divalent radical, and $R_{15}$ is selected from the group consisting of hydrogen and monovalent organic radicals.

The ureido-containing monomers, the cyanoacetoxy-containing monomers, and the acetoacetoxy-containing monomers, when used, are generally employed in a concentration sufficient to enhance the wet adhesion strength of the emulsion, e.g., from about 0.25 to about 1 weight percent wet adhesion monomer based on the total weight of the graft polymer.

In addition, a cross-linking agent is optionally employed in synthesizing the graft polymer. When used, the cross-linking agent is generally added simultaneously during the addition of the monomer units. Typical cross-linking agents include, but are not limited to, N-methylol acrylamide, N-methylol methacrylamide, diacrylates, dimethacrylates, triallyl cyanurate, diallyl maleate, methyl acrylamidoglycolate methyl ether, olefinically unsaturated monomers having the formula XII

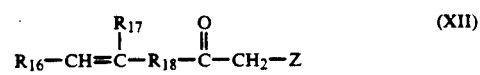
(XII)

and mixtures thereof, wherein $R_{16}$ is selected from the group consisting of hydrogen and halogen, $R_{17}$ is selected from the group consisting of hydrogen, halo, thio, and monovalent organic radicals, $R_{18}$ is a divalent radical, and Z is selected from the group consisting of organoacyl and cyano. Preferably, $R_{16}$ is hydrogen, $R_{17}$ is hydrogen or an alkyl radical having up to about 10 carbon atoms, $R_{18}$ is a cyclic or acyclic organic radical containing up to about 40 carbon atoms, and Z is an organoacyl having the formula XIII

wherein $R_{19}$ is selected from the group consisting of hydrogen and monovalent organic radicals. More preferably, $R_{18}$ is an acyclic radical containing up to about 20 atoms in length, with any and all side groups each being up to about 6 atoms in length, and $R_9$ is hydrogen or an alkyl group containing up to about 7 carbon atoms. $R_{18}$ is most preferably an alkylene group containing up to about 10 carbon atoms, and $R_{19}$ is most preferably methyl. Due to its commercial availability, the preferred cross-linking agent of formula XII is acetoacetoxyethyl methacrylate. However, the most preferred cross-linking agent is N-methylol acrylamide.

When a cross-linking agent is employed, the graft polymer generally contains about 0.2 to about 5 weight percent cross-linking agent, but preferably about 1 to about 3 weight percent cross-linking agent. As used in the specification and claims, the term "weight percent cross-linking agent" means the total dry weight of the cross-linking agent employed in making the graft polymer divided by the total weight of the alpha, beta-ethylenically unsaturated monomer units employed in making the polymer, this quotient being multiplied by 100%.

Depending on the alpha, beta-ethylenically unsaturated monomer units employed in the synthesis process, the graft polymer can be devoid of moieties that, when the graft polymer is subject to hydrolysis, yields a 1,2-diol-containing compound. For example, the graft polymer can be devoid of carboxylic acid monomer units (e.g., acrylic acid monomer units) or polycarboxylic homopolymers (e.g., polyacrylic acid homopolymer).

Generally, the concentration of the alpha, beta ethylenically unsaturated monomers and the lipophilic polymer in the aqueous medium is sufficient for the graft polymer to have a content, based on the weight of the graft polymer, of up to about 50 weight percent lipophilic polymer and at least about 50 weight percent alpha, beta-ethylenically unsaturated monomer units. To keep the graft polymer cost effective, it is preferred that the graft polymer contain up to about 25 weight percent lipophilic polymer and at least 75 weight percent alpha, beta-ethylenically unsaturated monomer units, each weight percent being based on the weight of the graft polymer. Usually, the graft polymer comprises at least about 0.1 weight percent, and preferably at least about 1 weight percent, lipophilic polymer. More preferably, the graft polymer comprises about 1 to about 20 weight percent lipophilic polymer and about 80 to about 99 weight percent alpha, beta-ethylenically unsaturated monomer units.

The resulting graft polymer can exhibit performance characteristics of the lipophilic polymer component while costing less per unit weight than the graft polymer's lipophilic polymer component.

The graft polymers and emulsions of the present invention have many utilities. These applications include use as (a) a water-resistant film, (b) a binder in paints and varnishes, (c) a pressure-sensitive adhesive, (d) a laminating adhesive, (e) a wood, plastic, roofing, and street surface coating, and (f) the solid phase in medical diagnostic analysis. When used in a composition, such as a paint, a varnish, or other coating, the composition is applied to at least a portion of a surface of a substrate. Upon drying, the composition forms a film.

The following example demonstrates the preparation of an exemplary graft polymer within the scope of the present invention. However, the invention is not limited to the example, but is defined by the claims.

EXAMPLE

PREPARATION OF GRAFT POLYMER

A monomer mixture comprising styrene (about 315 g), butyl acrylate (about 120 g), ethylhexyl acrylate (about 60 g), acrylonitrile (about 60 g), and methacrylic acid (about 15 g) was prepared. A dispersion comprising about 200 g water, about 4.9 g Alipal CO436 brand anionic surfactant (available form GAF), and about 81.4 g of a water dispersion of Spensol L51-35 brand water reducible aliphatic urethane (about 35% solids; available from Spencer Kellogg Products of NL Chemicals) was also prepared.

Water (about 350 g) was added to a reactor and heated while purging the reactor with nitrogen. When the water reached a temperature of about 180° F., about 0.5 g sodium persulfate and about 18 g of a solution containing a polystyrene seed (about 30% solids, the seed having a particle size of about 30 nm) were individually added to the reactor. Next, a pre-emulsion comprising the monomer mixture and the water dispersion of the polyurethane resin was delay-added to the reactor over a period of about three hours while maintaining the temperature within the reactor of about 185° F. During the delay-addition, additional initiation catalyst and a graft promoting system were simultaneously introduced into the reactor via a solution containing about 0.5 g sodium persulfate, about 30 g water, about 0.5 g cerium ammonium nitrate, and about 0.5 g nitric acid.

At the end of the three hour period, the contents of the reactor were neutralized with a solution containing about 6 ml of ammonium hydroxide and about 20 ml of water. The emulsion had a final pH of about 8.7 and a total solid content of about 45.2 weight percent.

Gas permeation chromatography indicated that the resulting emulsion contained only one peak. In contrast, a physical mixture of the water dispersion of the polyurethane resin employed in the above example and a polymer made from the same monomers present in the monomer mixture used in the example showed two peaks. Accordingly, the gas permeation chromatography analysis confirms that a graft polymer is formed by the exemplary procedure described in the above example.

Although the present invention has been described in considerable detail with reference to certain preferred versions thereof, other versions are possible. For example, other ingredients such as chain-transfer agents can be present in the aqueous medium during the graft polymerization synthesis procedure of the present invention. Therefore, the spirit and scope of the appended claims should not necessarily be limited to the description of the preferred embodiments contained herein.

What is claimed is:

1. A synthesis process comprising the step of polymerizing alpha, beta-ethylenically unsaturated monomer units in an aqueous medium containing a graft promoting system and a lipophilic polymer at reaction conditions sufficient to form a latex-lipophilic polymer composed of the lipophilic polymer and the polymerized alpha, beta-ethylenically unsaturated monomers units, wherein the lipophilic polymer (a) is devoid of olefinic unsaturation and (b), prior to becoming part of the latex-lipophilic polymer, contains at least one secondary and/or tertiary carbon atom.

2. The process of claim 1 wherein the aqueous medium further comprises a locus for polymerization.

3. The process of claim 1 wherein the aqueous medium further comprises an initiation catalyst.

4. The process of claim 1 wherein the aqueous medium further comprises a locus for polymerization and an initiation catalyst.

5. The process of claim 1 wherein at least a portion of the process is conducted under a substantially inert atmosphere.

6. The process of claim 1 wherein the lipophilic polymer is a low molecular weight polymer.

7. The process of claim 6 wherein the lipophilic polymer has a molecular weight of less than about 200,000.

8. The process of claim 6 wherein the lipophilic polymer has a molecular weight of less than about 100,000.

9. The process of claim 1 wherein the concentration of the alpha, beta-ethylenically unsaturated monomer units and the lipophilic polymer in the aqueous medium is sufficient for the latex-lipophilic polymer to have a content, based on the weight of the latex-lipophilic polymer, of about 0.1 to about 50 weight percent lipophilic polymer and at least about 50 weight percent alpha, beta-ethylenically unsaturated monomer units.

10. The process of claim 1 wherein the alpha, beta-ethylenically unsaturated monomer units are polymerized by an emulsion polymerization procedure.

11. The process of claim 1 wherein the alpha, beta-ethylenically unsaturated monomer units are polymerized by an emulsion polymerization procedure; the aqueous medium further comprises a locus for polymerization, and an initiation catalyst; at least a portion of the process is conducted under a substantially inert atmosphere; the lipophilic polymer is a condensation polymer; the latex-lipophilic polymer is a graft polymer; and the concentration of the alpha, beta-ethylenically unsaturated monomer units and the lipophilic polymer in the aqueous medium is sufficient for the graft polymer to have a content, based on the weight of the graft polymer, of about 0.1 to about 50 weight percent lipophilic polymer and at least about 50 weight percent alpha, beta-ethylenically unsaturated monomer units.

12. The process of claim 11 wherein the graft promoting system is a cerium ammonium nitrate/nitric acid system.

13. A synthesis process comprising the step of polymerizing alpha, beta-ethylenically unsaturated monomer units in an aqueous medium containing a graft promoting system and a condensation polymer at reaction conditions sufficient to form a latex-lipophilic polymer composed of the condensation polymer and the polymerized alpha, beta-ethylenically unsaturated monomers units, wherein the condensation polymer (a) is devoid of olefinic unsaturation and (b), prior to becoming part of the latex-lipophilic polymer, contains at least one secondary and/or tertiary carbon atom.

14. A synthesis process comprising the step of polymerizing alpha, beta-ethylenically unsaturated monomer units in an aqueous medium containing a graft promoting system and a first polymer at reaction conditions sufficient to form a latex-lipophilic polymer composed of the first polymer and the polymerized alpha, beta-ethylenically unsaturated monomers units, the first polymer being selected from the group consisting of polyurethane polymers, polyester polymers, epoxy polymers, silicon polymers, polyamide polymers, and polycarbonate polymers, wherein the first polymer (a) is devoid of olefinic unsaturation and (b), prior to becoming part of the latex-lipophilic polymer, contains at least one secondary and/or tertiary carbon atom.

15. A synthesis process comprising the step of polymerizing alpha, beta-ethylenically unsaturated monomer units in an aqueous medium containing a graft promoting system and a lipophilic polymer at reaction conditions sufficient to form a latex-lipophilic polymer composed of the lipophilic polymer and the polymerized alpha, beta-ethyleneically unsaturated monomers units, wherein the lipophilic polymer (a) is devoid of olefinic unsaturation and (b), prior to becoming part of the latex-lipophilic polymer contains at least one secondary carbon atoms.

16. A synthesis process comprising the step of polymerizing alpha, beta-ethylenically unsaturated monomer units in an aqueous medium containing a graft promoting system and a lipophilic polymer at reaction conditions sufficient to form a latex-lipophilic polymer composed of the lipophilic polymer and the polymerized alpha, 17. The process of claim 1 wherein the lipophilic polymer is an urethane polymer.

18. The process of claim 1 wherein the lipophilic polymer is introduced into the aqueous medium by dissolving a substantially dry, solid lipophilic polymer in a plurality of the alpha, beta-ethylenically unsaturated monomer units to form a feed and the feed is combined with the aqueous medium.

19. The process of claim 13 wherein the condensation polymer is introduced into the aqueous medium by dissolving a substantially dry, solid condensation polymer in a plurality of the alpha, beta-ethylenically unsaturated monomer units to form a feed and the feed is combined with the aqueous medium.

20. The process of claim 14 wherein the first polymer is introduced into the aqueous medium by dissolving a substantially dry, solid first polymer in a plurality of the alpha, beta-ethylenically unsaturated monomer units to form a feed and the feed is combined with the aqueous medium.

* * * * *

UNITED STATES PATENT AND TRADEMARK OFFICE
CERTIFICATE OF CORRECTION

PATENT NO.  : 5,116,901

DATED      : May 26, 1992

INVENTOR(S) : John Biale

It is certified that error appears in the above-identified patent and that said Letters Patent is hereby corrected as shown below:

[57] ABSTRACT, replace "unit" with -- units --.

Claim 15, column 12, line 33, after "polymer" insert -- , --.

Claim 16, column 12, line 41, after "alpha," insert -- beta-ethylenically unsaturated monomers units, wherein the lipophilic polymer (a) is devoid of olefinic unsaturation and (b), prior to becoming part of the latex-lipophilic polymer, contains at least one tertiary carbon atom. --

Signed and Sealed this

Third Day of August, 1993

Attest:

MICHAEL K. KIRK

*Attesting Officer*   *Acting Commissioner of Patents and Trademarks*